(12) United States Patent
Brum

(10) Patent No.: US 10,913,534 B1
(45) Date of Patent: Feb. 9, 2021

(54) AIRBORNE DOCKING SYSTEM AND METHOD FOR UNMANNED AERIAL VEHICLE RECOVERY

(71) Applicant: Meggitt Defense Systems, Inc., Irvine, CA (US)

(72) Inventor: Roger D. Brum, San Juan Capistrano, CA (US)

(73) Assignee: Meggitt Defense Systems, Inc., Irvine, CA (US)

( * ) Notice: Subject to any disclaimer, the term of this patent is extended or adjusted under 35 U.S.C. 154(b) by 805 days.

(21) Appl. No.: 15/651,710

(22) Filed: Jul. 17, 2017

Related U.S. Application Data

(60) Provisional application No. 62/366,989, filed on Jul. 26, 2016.

(51) Int. Cl.
| | |
|---|---|
| *B64D 1/02* | (2006.01) |
| *B64D 1/00* | (2006.01) |
| *B64D 5/00* | (2006.01) |
| *B64C 39/02* | (2006.01) |
| *B64C 5/00* | (2006.01) |

(52) U.S. Cl.
CPC .................. *B64D 1/02* (2013.01); *B64C 5/00* (2013.01); *B64C 39/024* (2013.01); *B64D 1/00* (2013.01); *B64C 2201/082* (2013.01); *B64C 2201/102* (2013.01)

(58) Field of Classification Search
CPC ... B64D 5/00; B64D 3/00; B64D 3/02; B64D 39/06; B64C 2201/082; B64C 2201/102; B64C 37/02
See application file for complete search history.

(56) References Cited

U.S. PATENT DOCUMENTS

| | | | |
|---|---|---|---|
| 2,327,216 | A | 8/1943 | Reiber |
| 2,388,013 | A * | 10/1945 | Rasor ..................... B64D 39/06 244/3 |
| 2,661,806 | A | 12/1953 | Nims et al. |
| 2,669,310 | A | 2/1954 | Haskins |
| 2,751,167 | A | 6/1956 | Hopper et al. |
| 2,760,777 | A | 8/1956 | Cotton |
| 3,037,559 | A | 6/1962 | Blackburn |
| 3,801,219 | A | 5/1974 | Fauth |
| 3,902,822 | A | 9/1975 | Andrews et al. |
| 4,125,812 | A | 11/1978 | Polonio |
| 4,496,159 | A | 1/1985 | Dugan et al. |
| 4,692,093 | A | 9/1987 | Safarik |

(Continued)

FOREIGN PATENT DOCUMENTS

| | | | | |
|---|---|---|---|---|
| DE | 911457 C | * | 5/1954 | ............... B64D 5/00 |
| FR | 2521098 A1 | * | 8/1983 | ............... B64D 3/00 |
| GB | 546587 A | * | 7/1942 | ............... B64D 5/00 |

*Primary Examiner* — Richard R. Green
(74) *Attorney, Agent, or Firm* — Stetina Brunda Garred and Brucker

(57) ABSTRACT

An airborne docking method is provided for an unmanned aerial vehicle. The airborne docking method includes securing an unmanned aerial vehicle (UAV) to a host aircraft via a docking assembly having a base coupled to the host aircraft, a tug device, and a cable connecting the tug device to the base, the tug device being engaged with the base, and the UAV being engaged to the tug device. The tug device is deployed from the base and the cable is extended therebetween to distance the tug device from the base. The UAV is then disengaged from the tug device.

21 Claims, 10 Drawing Sheets

(56) References Cited

U.S. PATENT DOCUMENTS

| | | | | |
|---|---|---|---|---|
| 4,701,104 | A | | 10/1987 | Cohen |
| 4,757,959 | A | * | 7/1988 | Schroder .................. B64D 3/00 |
| | | | | 244/137.4 |
| 4,770,368 | A | * | 9/1988 | Yates ....................... B64D 3/02 |
| | | | | 244/1 TD |
| 5,249,924 | A | | 10/1993 | Brum |
| 6,869,042 | B2 | * | 3/2005 | Harrison ................ B64D 39/06 |
| | | | | 244/137.4 |
| 8,371,525 | B2 | * | 2/2013 | Haggard ................ B64D 3/02 |
| | | | | 244/1 TD |

* cited by examiner

AIRBORNE DOCKING SYSTEM AND METHOD FOR UNMANNED AERIAL VEHICLE RECOVERY

CROSS-REFERENCE TO RELATED APPLICATIONS

This application claims the benefit of U.S. Provisional Application No. 62/366,989, filed Jul. 26, 2016, the contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to unmanned aerial vehicles (UAVs), and more specifically to an airborne docking method and related system for deploying and capturing the UAVs relative to a host aircraft.

2. Description of the Related Art

Unmanned aerial vehicles (UAVs), commonly known as drones, have become increasingly more popular in both civilian and military environments. A critical feature of UAVs is their ability to be flown without a human pilot aboard. A typical UAV flight may be achieved with varying levels of autonomy, either under remote control by a human operator or fully or intermittently autonomously by onboard computers. Due to the ability of UAVs to be flown without a human pilot onboard, UAVs have found particular appeal and usefulness in military applications, which involve missions that may be too dangerous for humans.

In many instances, UAVs take-off and land like many conventional aircraft, i.e., from a runway on land or an aircraft carrier. As such, UAVs may be associated with certain flight ranges or flight times based on the location of the take-off and landing locations, which may rule out UAVs from consideration for performing certain missions. For instance, if a mission is associated with a range or flight time that exceeds that of the UAV, the UAV cannot be used for the mission.

Furthermore, the autonomy associated with UAVs has also created a desire to deploy UAVs as required based on information gathered in real-time from other aircraft. For instance, a manned aircraft may acquire information in flight, which may give rise to a desired mission. However, mission may be too remote from a ready UAV launch-site to allow for a UAV to perform the desired mission.

Accordingly, there is a need in the art for a UAV docking system which enables airborne docking (e.g., launching and retrieval) of a UAV. Various aspects of the present disclosure address this particular need, as will be discussed in more detail below.

BRIEF SUMMARY

In accordance with one embodiment of the present disclosure, there is provided an airborne docking method and related system, which allows for the release and capture of one or more unmanned aerial vehicles (UAVs) from larger crafts, thereby making such UAVs deployable. Such deployable vehicles have the advantage of being dispersed as required to meet a mission objective.

According to one embodiment, an airborne docking method for an unmanned aerial vehicle comprises the steps of: securing an unmanned aerial vehicle (UAV) to a host aircraft via a docking assembly having a base coupled to the host aircraft, a tug device, and a cable connecting the tug device to the base, the tug device being engaged with the base, and the UAV being engaged to the tug device; deploying the tug device from the base and extending the cable therebetween to distance the tug device from the base; and disengaging the UAV from the tug device.

The method may also include the step of transitioning wings on the UAV from a stowed configuration to a deployed configuration after the disengaging step.

The method may also include the step of retracting the tug device after the disengaging step. The method may further comprise the step of redeploying the tug device from the base after the retracting step.

The method may include the step of transmitting a beacon signal to the UAV. The method may further comprise the step of engaging the UAV with the tug device while the UAV is in flight. The UAV and the tug device may be collectively configured to create negative pressure therebetween as a result of fluid flowing by the UAV and the tug device so as to urge the UAV toward the tug device during the step of engaging the UAV with the tug device. The step of engaging the UAV with the tug device may include deploying a connector on the UAV, the connector being engageable with the tug device.

The method may further comprising the step of transitioning the wings on the UAV from a deployed configuration to a stowed configuration after the UAV has been engaged with the tug device.

According to another embodiment, there is provided an airborne docking system for use with a host aircraft. The airborne docking system includes a base connectable to the host aircraft, and a cable connected to the base, the cable being configured to define an exposed portion as that portion of the cable extending out from the base. A tug device is engaged with the cable and is transitional relative to the base between a stowed position and a deployed position, with the tug device moving away from the base and increasing a length of the exposed portion of cable as the tug device transitions from the stowed position toward the deployed position. An unmanned aerial vehicle (UAV) is engageable with the tug device, with the UAV being transitional between first, second, and third modes. In the first mode, the UAV is engaged with the tug device while the tug device is transitioned from the stowed position to the deployed position. In the second mode, the UAV is disengaged from the tug device and is configured to operate independent of the tug device. In the third mode, the UAV is engaged with the tug device while the tug device is transitioned from the deployed position to the stowed position.

The airborne docking system may further include a winch coupled to the base and the cable, with the winch being adapted to control movement of the cable relative to the base. The airborne docking system may include a ram air turbine in operative communication with the winch for providing power to the winch.

The tug device may include a tug fuselage and at least one controllable lifting surface moveable relative to the tug fuselage for controlling lift and lateral motion generated by the tug device. The at least one controllable lifting surface may be capable of controlling longitudinal and lateral position of the tug device relative to the UAV, with the at least one controllable lifting surface being electronically controlled by a processor to guide the tug device toward the UAV. The tug device may include a variable drag device for controlling the longitudinal position of the tug device.

The tug device may include a first transceiver and the UAV includes a second transceiver, the first and second transceivers configured to communicate with each other.

The UAV may include a fuselage and a pair of wings selectively transitional relative to the fuselage between a stowed configuration and a deployed configuration, wherein a portion of each wing moves away from the fuselage as the pair of wings transition from the stowed configuration toward the deployed configuration. The pair of wings may pivot relative to the fuselage between the stowed configuration and the deployed configuration.

The UAV may include a connector adapted to engage with the tug device. The UAV may include a fuselage, and the connector may be transitional relative to the fuselage between a stowed position and a deployed position. The connector may be of a variable length, with the connector being configured to enable shortening of the variable length after engagement with the tug device to pre-load the UAV and the tug device together to act as a single unit.

The UAV may defines a first static margin and the UAV and tug device may collectively define a second static margin when the UAV is connected to the tug device, the second static margin being greater than the first static margin.

The UAV and the tug device may collectively be configured to generate negative pressure therebetween in response to fluid flow over the UAV and the tug device.

The tug device may include a fuselage and a pair of guides coupled to the fuselage and positioned forward of a center of pressure of the tug device, with the guides being configured to facilitate alignment of the UAV relative to the tug device as the UAV approaches the fuselage for docking. The guides may be moveable relative to the fuselage between an extended position and a retracted position, with a distal end of each guide moving away from the fuselage as each guide moves from the retracted position toward the extended position.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 4A is a cross sectional view;

Common reference numerals are used throughout the drawings and the detailed description to indicate the same elements.

DETAILED DESCRIPTION

Figure 1:
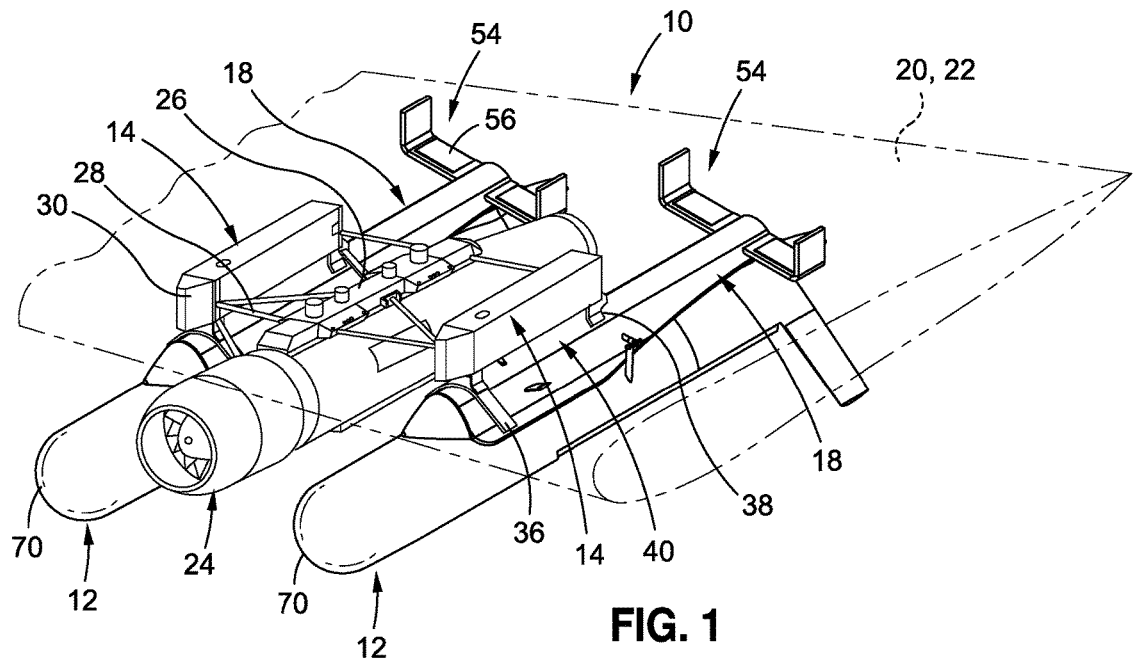
FIG. 1 is an upper perspective view of an airborne docking system in a stowed configuration.

The detailed description set forth below in connection with the appended drawings is intended as a description of certain embodiments of an airborne docking system and related method and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Referring now to the drawings, wherein the showings are for purposes of illustrating a preferred embodiment of the present disclosure only, and are not for purposes of limiting the same, there is depicted an airborne docking system 10 for airborne release and capture of an unmanned aerial vehicle (UAV) 12 or drone. Airborne deployment of one or more UAVs 12 may provide certain advantages, particularly in military applications, wherein the deployed UAVs 12 can be deployed as required to meet a mission objective.

As used herein, the term "docking" broadly refers to the release and/or retrieval of a UAV 12.

According to one embodiment, the airborne docking system 10 generally includes the UAV 12, a base 14, a towline (e.g., cable) 16, and an air tug 18 (also referred to herein as a tug device), with the towline 16 extending between the base 14 and the air tug 18. The airborne docking system 10 is configured for use with a host aircraft 20 capable of carrying the airborne docking system 10 to a preferable altitude for both capture and release. As shown in the figures, the airborne docking system 10 is shown as being attached to the aircraft 20 under a wing 22 of the aircraft 20, although it is understood that the scope of the present disclosure is not limited thereto. Along these lines, it is contemplated that the airborne docking system 10 may be mounted adjacent the tail of the host aircraft 20, or other portions of the fuselage of the host aircraft 20. Furthermore, the exemplary airborne docking system 10 depicted in the figures includes a pair of UAVs 12, a pair of bases 14, a pair of towlines 16, and a pair of air tugs 18, although any number of UAVs 12, bases 14, towlines 16, and air tugs 18 may be included in the airborne docking system 10 without departing from the spirit and scope of the present disclosure.

Each base 14 may be attached to a mounting member 26, which may be mounted directly to the wing 22 or other structure of the host aircraft 20. In the exemplary embodiment, the mounting member 26 is positioned under the wing 22, with the mounting member 26 including a forward end portion and an opposing rear end portion. Attached to the mounting member 26 is a reeling device 24, the purpose of which will be described in more detail below.

The airborne docking system 10 depicted in the Figures includes a pair of bases 14 coupled to the mounting member 26, with the mounting member 26 being centrally located between the bases 14 and attached to the reeling device 24, which is depicted as a ram air turbine, for powering a winch located in each base 14. Several support elements 28 extend between the mounting member 26 and each base 14 to connect each base 14 in spaced relation to the mounting member 26 and to transfer power from the ram air turbine 24 to the winch in the base 14. Each base 14 has a tapered forward end portion 30 to enhance the aerodynamic profile thereof. Each base 14 also extends in generally parallel relation to the mounting member 26, the ram air turbine 24, and the other base 14. In other words, the longitudinal axis of each base 14 is generally parallel to the longitudinal axis of the mounting member 26, the ram air turbine 24, and the other base 14.

Figure 3:
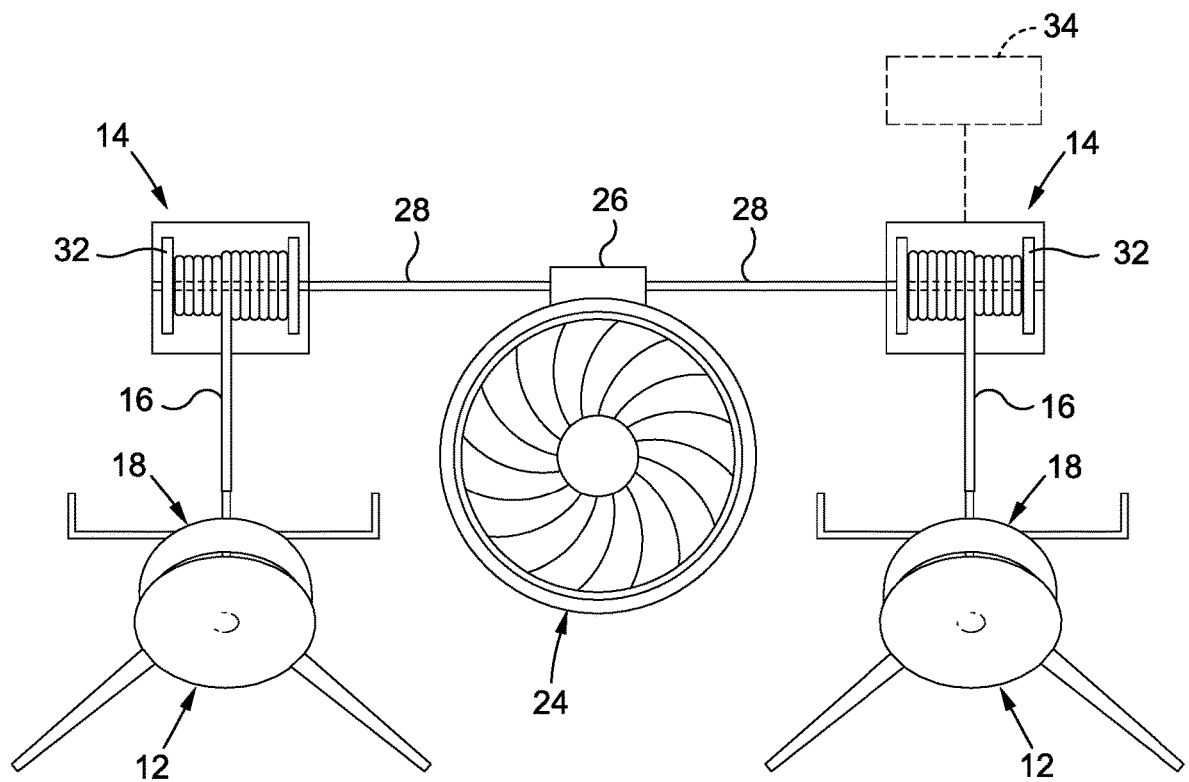
FIG. 3 is a front schematic view of the airborne docking system.

Referring now specifically to FIG. 3, inside of each base 14 is a winch 32 operatively coupled to the towline 16 to control the extension and retraction of the towline 16. Along these lines, a bottom side of the base 14 may be open, or may include a slot formed therein to allow the towline 16 to extend out of the base 14. The winch 32 may be driven by the ram air turbine 24, or alternatively, an electric motor 34. The ram air turbine 24 is specifically configured and adapted to generate power from the passing airstream by ram pressure due to the speed of the aircraft 20. For more information on a ram air turbine, please refer to U.S. Pat. No. 5,249,924 entitled Ram Air Turbine, the contents of which are expressly incorporated herein by reference.

Figure 6:
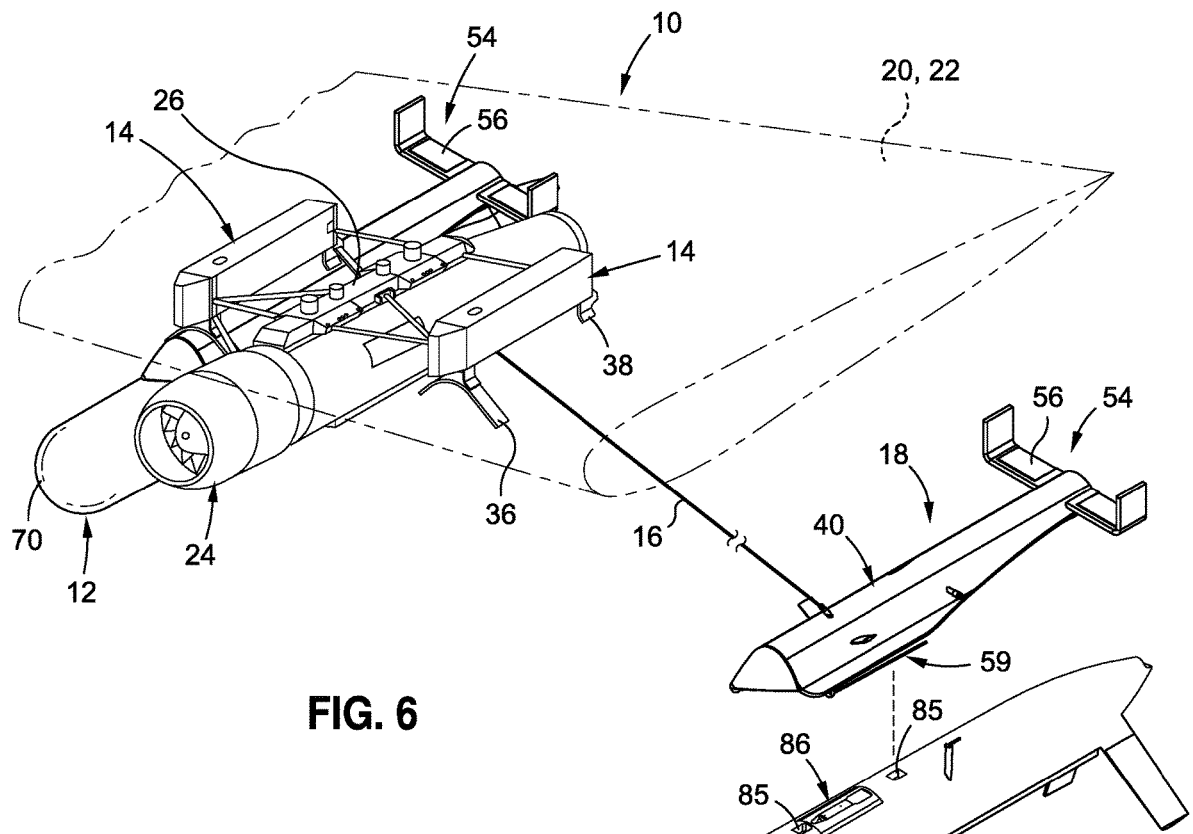
FIG. 6 is an upper perspective view of the airborne docking system in the deployed configuration, with the UAV being released from the air tug.
Figure 7:
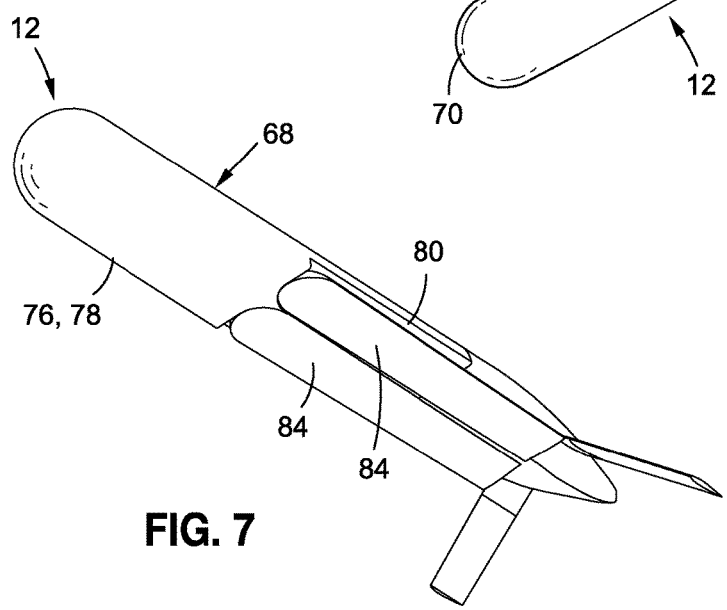
FIG. 7 is a lower perspective view of the UAV with its wings in a stowed configuration.

Referring now to FIG. 6, attached to the base 14 is forward receiving bracket 36 and an aft receiving bracket 38, with the receiving brackets 36, 38 extending below the base 14 and being adapted to engage with the air tug 18 for aligning and stabilizing the air tug 18 when the air tug 18 is retracted toward the base 14. The forward and aft receiving brackets 36, 38 are spaced from each other and are designed to engage with separate regions of the air tug 18.

Figure 4:
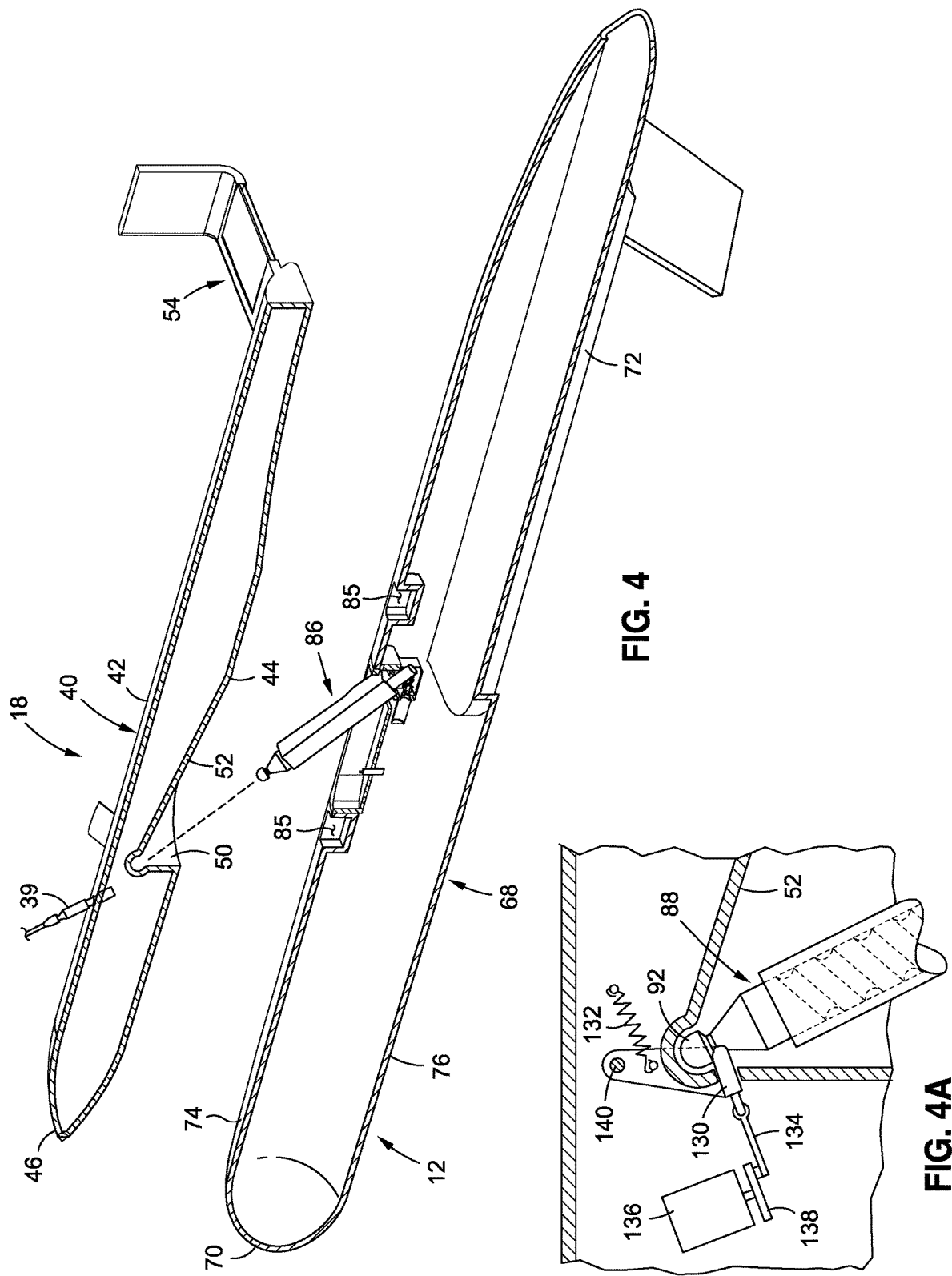
FIG. 4 is an upper perspective, cross sectional view of the air tug and UAV.
Figure 5:
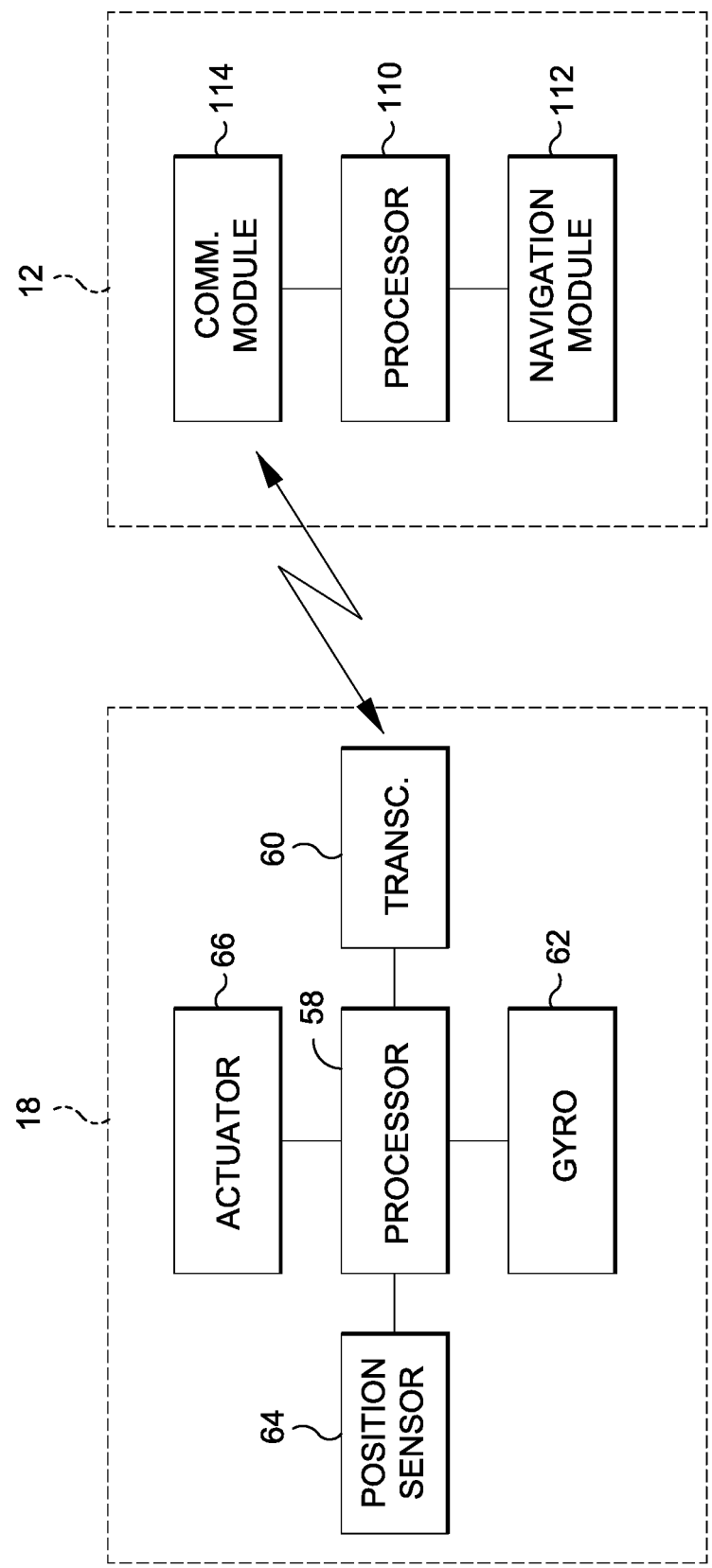
FIG. 5 is a schematic representation of electrical components associated with the air tug and UAV.

One end of the towline 16 is attached to the winch 32 (see FIG. 3), and the other end of the towline 16 is coupled to the air tug 18 via a towline connector 39 (see FIG. 4). The air tug 18 includes a main body 40 including a top portion 42, a bottom portion 44, a forward portion 46, and an aft portion 48. Referring to FIG. 4, the bottom portion 44 includes a concave region including one or more tapered surfaces. According to one embodiment, the concave region includes a first tapered surface 50 extending toward the top portion 42 in an approximate vertical direction, and a second surface 52 extending away from the top portion 42 in a down and aft direction, with the first tapered surface 50 and the second surface 52 forming an apex therebetween. The first and second surfaces 50, 52 define a cavity, which facilitates capture of the UAV 12, as will be described in more detail below.

Figure 8:
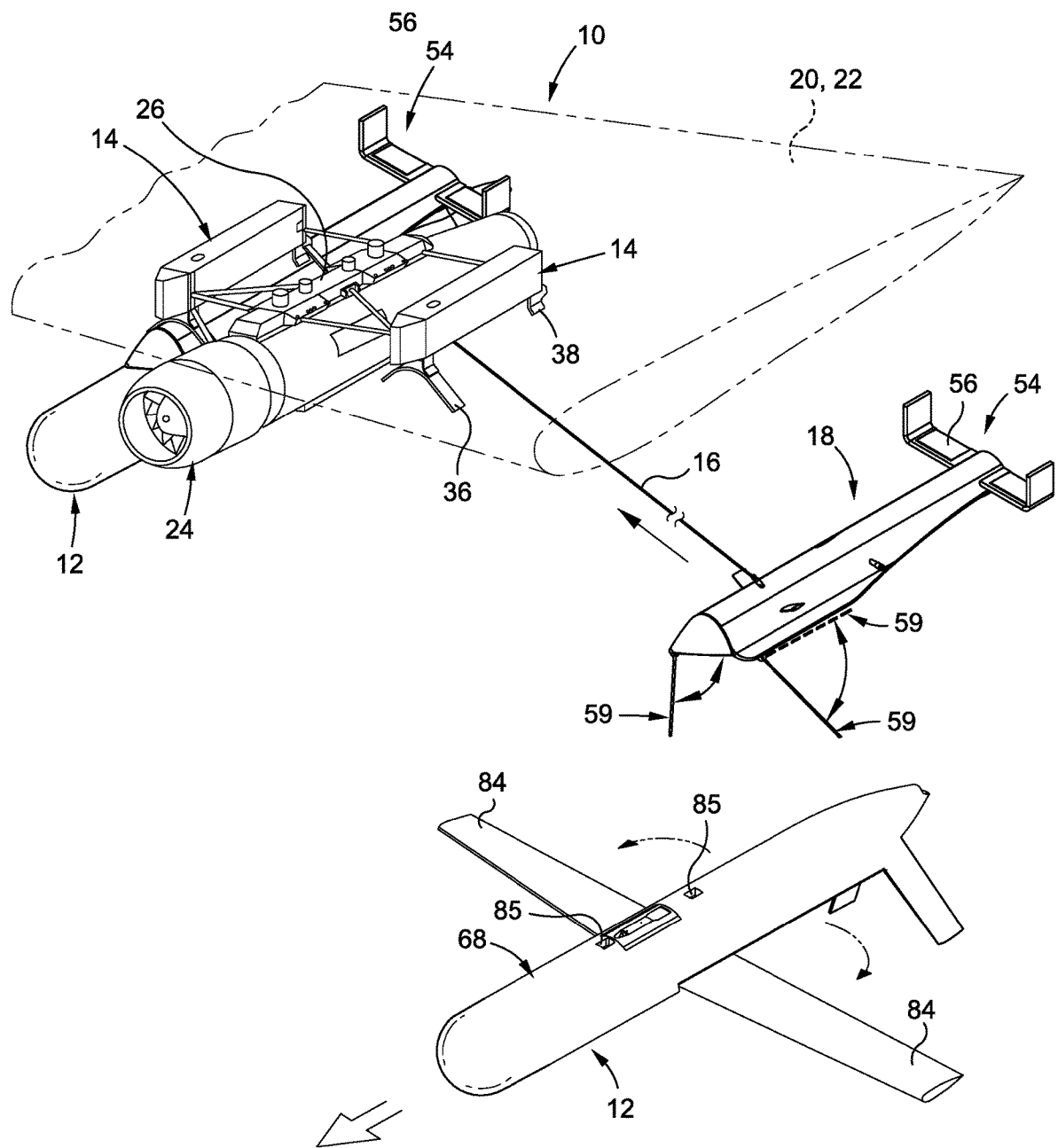
FIG. 8 is an upper perspective view of the airborne docking system in the deployed configuration, with the UAV being released from the air tug and having its wings in a deployed configuration.
Figure 9:
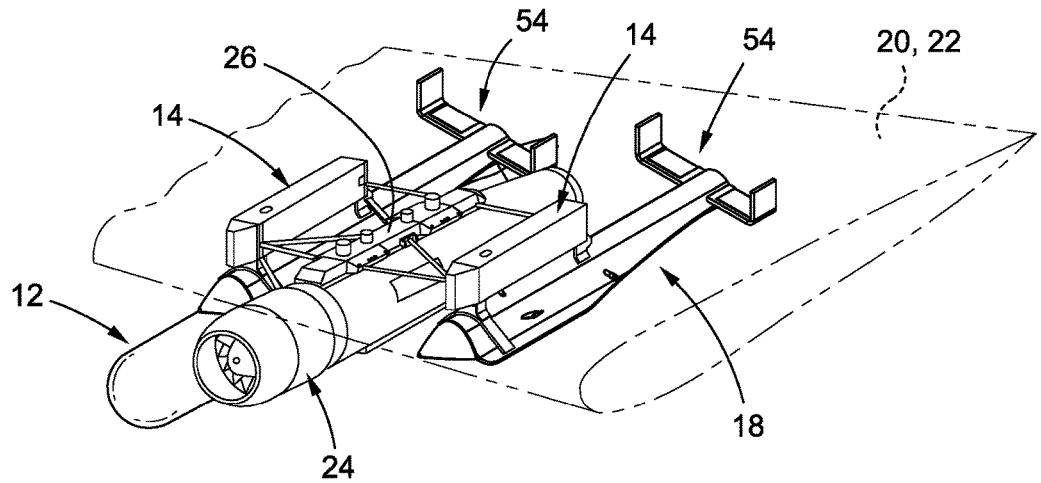
FIG. 9 is an upper perspective view of the air tug stowed after release of the UAV.

The air tug 18 may incorporate left and right guides 59 that can contact the UAV fuselage and cause the UAV 12 and the air tug 18 to align laterally as they approach docking. The guides 59 may be retractable as shown in FIG. 8 when not in use. In this regard, the guides may transition between an extended position and a retracted position relative to the fuselage of the air tug 18, with the distal ends of each guide 59 moving away from the fuselage as the guide transitions from the retracted position toward the extended position. Importantly, guides 59 are located forward of the center of pressure of the air tug 18 and positioned so contact is made forward of the center of pressure of the UAV 12.

Figure 2:
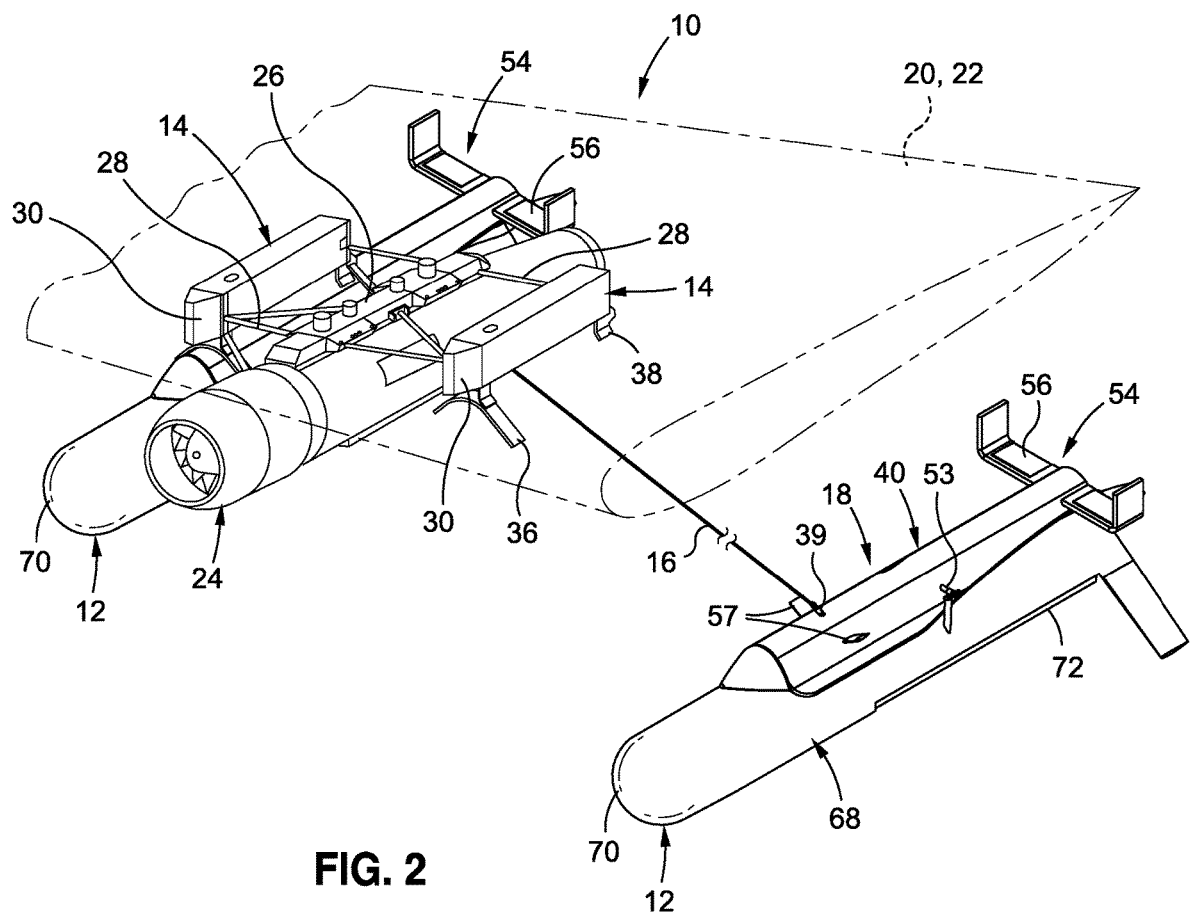
FIG. 2 is an upper perspective view of the airborne docking system in a deployed configuration, with an unmanned aerial vehicle (UAV) attached to an air tug.

A pin 53 (see FIG. 2) may be coupled to the main body 40 of the air tug 18, with the pin 53 being operative to lock the UAV 68 to the air tug 18 so that it may not be released prior to flight.

A tail 54 is coupled to the aft portion 48 and includes one or more lifting surfaces 56, which may be controllable to assist in mating of the air tug 18 to the UAV 12 as will be described in more detail below. Additional controllable lifting surface(s) 57 may also be coupled to, and extend from, the main body 40 to enhance the overall controllability of the air tug 18.

The air tug 18 may further include onboard electronics to control various functionalities of the air tug. Along these lines, the electronics may include a processor 58, a transceiver 60, a gyroscope 62 or similar sensors for determining the orientation of the air tug, position sensors 64 for determining the relative position of the controllable lifting surface(s), and one or more motors or actuators 66 for controlling the controllable lifting surface(s) 56 and 57. In this regard, the electronics may control the orientation (altitude, yaw, pitch, roll) and within limits, the position (e.g., longitudinal, lateral, vertical) of the air tug 18, particularly for mating with the UAV 12.

The UAV 12 includes a fuselage 68, including a nose 70 and an aft portion 72. A convex upper surface 74 and a lower surface 76 both extend from the nose 70 toward the aft portion 72, with the lower surface 76 including an outer region 78 and a recessed region 80. The convex upper surface 74 defines an apex region 82 running longitudinally along the fuselage 68.

Figure 10:
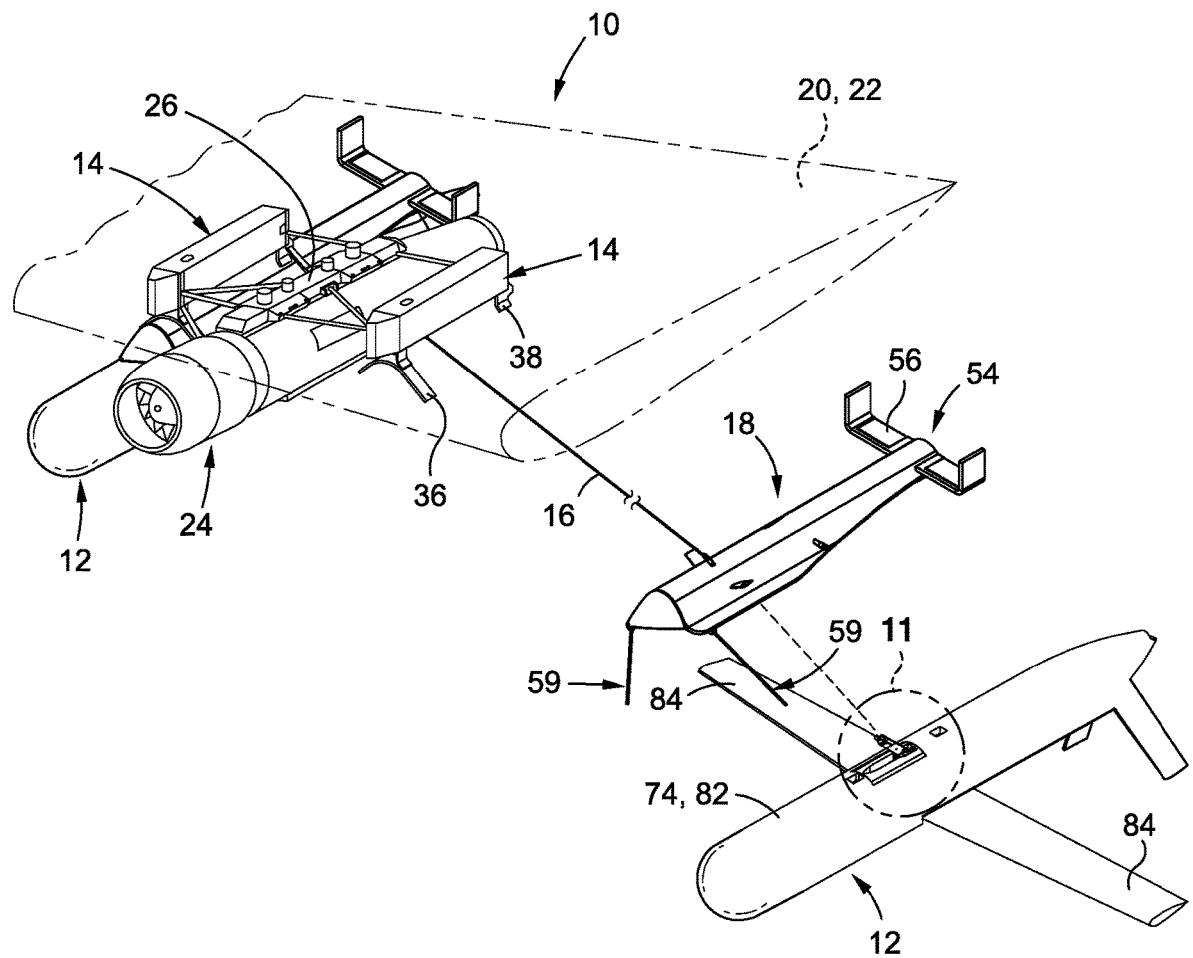
FIG. 10 is an upper perspective of the UAV approaching the air tug for docking therewith, the UAV having a connector deployed to facilitate docking with the air tug.

A pair of wings 84 are attached to the fuselage 68. According to one embodiment, the wings 84 are transitional between a stowed configuration and a deployed configuration, and thus, the wings 84 may be pivotally coupled to the fuselage 68 to enable transition between the stowed and deployed configuration. FIGS. 1, 2, 6, and 7 show the wings 84 in the stowed configuration, while FIGS. 8 and 10 show the wings 84 in the deployed configuration. When the wings 84 are in the stowed configuration, each wing 84 extends generally parallel to a longitudinal axis of the fuselage 68, with substantially the entirety of each wing 84 overlapping with a portion of the recessed region 80 of the lower surface 76. When the wings 84 are in the deployed configuration, the wings 84 extend in generally non-parallel relation to the longitudinal axis of the fuselage 68, and in some instances, the wings 84 extend generally perpendicular to the longitudinal axis. In the deployed configuration, a majority of each wing 84 extends outwardly from the fuselage 68 in non-overlapping relation to the recessed region 80 of the lower surface 76. As will be described in more detail below, the wings 84 preferably remain in the stowed configuration while the UAV 12 is attached to the air tug 18, and transition to the deployed configuration when separated from the air tug 18.

Figure 11:
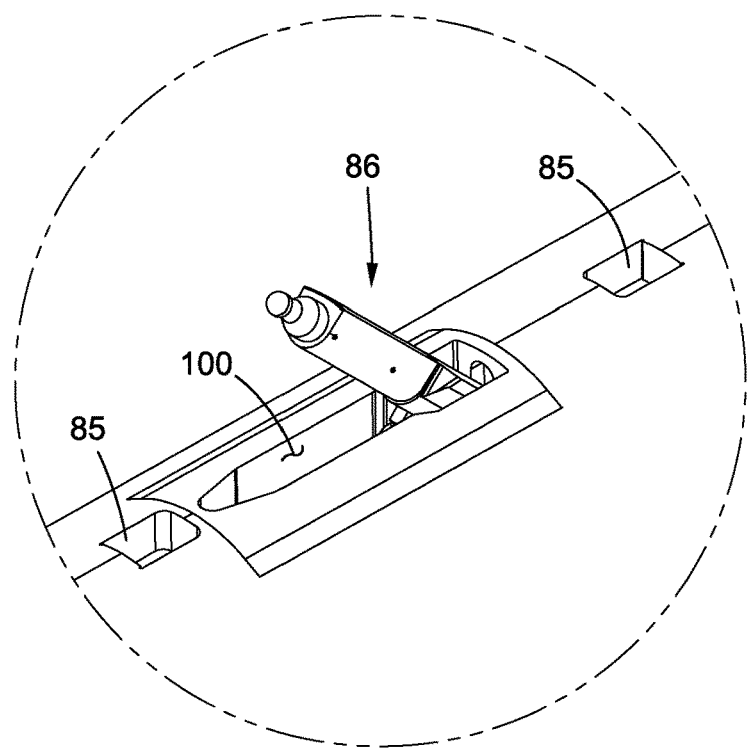
FIG. 11 is an enlarged upper perspective view of the connector in a deployed position.
Figure 12:
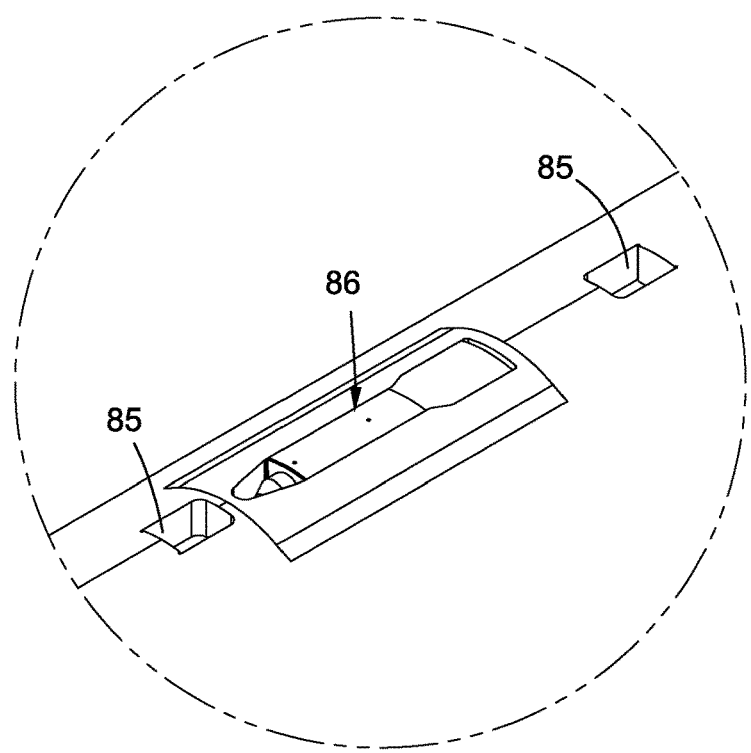
FIG. 12 is an enlarged upper perspective view of the connector in a retracted position.
Figure 14:
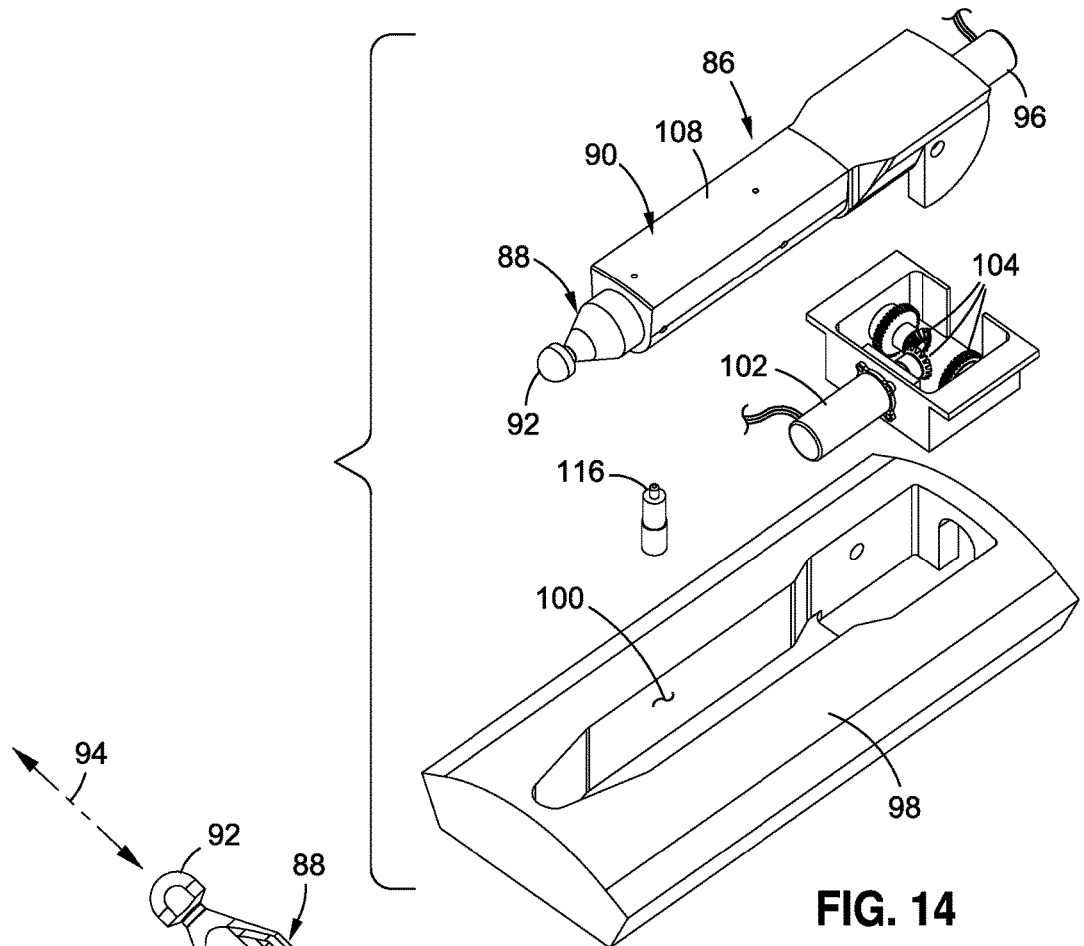
FIG. 14 is an exploded view of a connector assembly.
Figure 13:
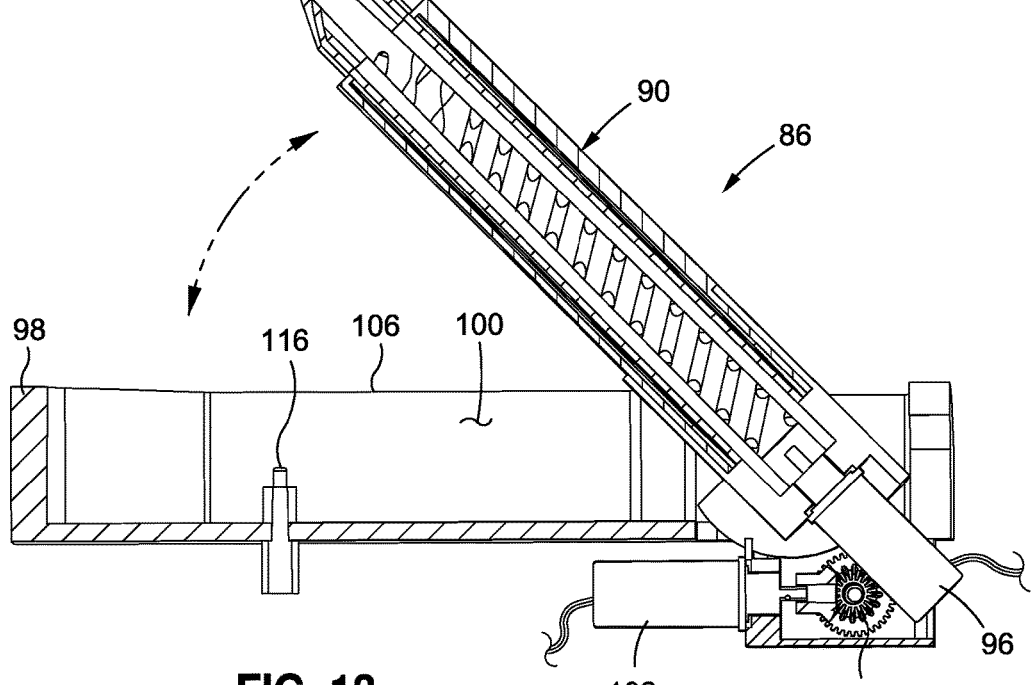
FIG. 13 is a side sectional view of the connector in the deployed configuration.

Located within the apex region 82 are multiple structures which facilitate engagement between the UAV 12 and the air tug 18. According to one embodiment, the UAV 12 includes a pair of cavities 85 and a deployable connector 86 for docking the UAV 12 with the air tug 18. The deployable connector 86 is adapted to engage with a latch 130 on the air tug 18, such that retraction of the latch 130 by the motor 136 acting through lever arm 138 and link 134 results in disengagement of the UAV 12 from the air tug 18. FIGS. 6, 8, and 12 show the connector 86 in a stowed position, and FIGS. 10, 11, and 13 show the connector 86 in a deployed position. According to one embodiment, and referring now specifically to FIG. 13, the connector 86 includes an extension arm 88 and a corresponding sleeve 90, which defines a cavity adapted to receive the extension arm 88. The extension arm 88 includes a distal end portion 92 and an opposing proximal end portion. The distal end portion 92 may be configured to engage with a corresponding connector element formed by cavity 52 and latch 130 on the air tug 18. In the exemplary embodiment, the distal end portion 92 includes a ball-like structure which may be received into a semi-spherically shaped connector 52 on the air tug 18, and retained by spring loaded latch 130 which would couple the UAV 12 to the air tug 18, while still allowing pivotal movement of the UAV 12 relative to the air tug 18 about multiple axes.

The extension arm 88 may be selectively extended out of, and retracted into, the sleeve 90 along an extension axis 94 to enable engagement between the UAV 12 and the air tug 18 at greater distances of separation between the air tug 18 and the UAV 12. When the extension arm 88 is extended out of the sleeve 90, the distance between the distal-most tip of the extension arm 88 and a distal end of the sleeve 90 increases, which also results in exposing a greater portion of the extension arm beyond the sleeve 90. The "exposed portion" refers to that portion of the extension arm which extends out of the sleeve 90. Once connection is achieved, i.e., once the extension arm 88 end 92 is engaged with the latch 130 on the air tug 18, the extension arm 88 may be retracted into the sleeve 90 to bring the UAV 12 closer to the air tug 18 and pre-loaded against it such that the combined air tug 18 and UAV 12 act as one. When the extension arm 88 is retracted into the sleeve 90, the distance between the distal-most tip of the extension arm 92 and the distal end of the sleeve 90 decreases, which also decreases the exposed portion of the extension arm 88.

According to one embodiment, the extension arm 88 and sleeve 90 include cooperating threads to enable extension and retraction of the extension arm 88 relative to the sleeve 90 via relative rotation therebetween. In this regard, the extension arm 88 may be rotated about the extension axis 94 in a first rotational direction to effectuate extension of the extension arm 94 relative to the sleeve 90, and alternatively, the extension arm 88 may be rotated about the extension axis 94 in an opposing second rotational direction to effectuation retraction of the extension arm 88 relative to the sleeve 90. A motor 96 is operatively coupled to the extension arm 88 and/or the sleeve 90 to cause rotation of the extension arm 88 relative to the sleeve 90 in the first and second rotational directions. It is understood that although the exemplary embodiment shows threaded engagement between the extension arm 88 and the sleeve 90 to enable extension and retraction of the extension arm 88, it is understood that other mechanisms for enabling such extension and retraction may also be used. For instance, the extension arm 88 may be coupled to a hydraulic piston which allows for extension and retraction of the extension arm 88.

According to one embodiment, the sleeve 90 is pivotal relative to the fuselage 68 of the UAV 12 between a stowed position and a deployed position, such that pivoting the sleeve 90 from the stowed position to the deployed position moves the distal end of the sleeve 90 away from the fuselage 68. Along these lines, the fuselage 68 includes a first cavity formed within the apex region 82, with the cavity being sized and configured to receive a connector base 98. The connector base 98, in turn, includes a second cavity 100 formed therein, with the second cavity 100 being complimentary in shape to the connector 86 when the extension arm 88 is in the retracted position. A motor 102 and corresponding gears 104 are operatively coupled to the sleeve 90 to control movement of the sleeve 90 between the stowed and deployed positions. When the sleeve 90 is in the stowed position a majority of the sleeve 90 resides below an upper surface 106 of the connector base 98, while one surface 108 of the sleeve 90 is substantially flush with the upper surface 106 of the connector base 98. When the sleeve 90 is in the deployed position, the distal end of the sleeve 90 extends out of the connector base 98, and away from the fuselage 68, thereby making extension of the extension arm 88 possible. The connector 86 also includes a switch 116 to indicate when the connector is fully retracted, flush with the upper surface of the UAV 12 and therefore in a low drag configuration.

The UAV 12 may include several onboard electronic components to control operation of the UAV 12. In this regard, the UAV 12 may include a processor 110, a navigations module 112 to control flight navigation of the UAV 12, and a communications module 114 to enable bi-directional communications (i.e., to and from the UAV). The UAV 12 also includes a propelling unit, such as a jet engine, propeller, or other modes of propulsion to allow the UAV 12 to move when detached from the air tug 18. In this regard, various embodiments of the UAV 12 are specifically designed to operate independent of the air tug 18 when detached from the air tug 18.

Figure 15:
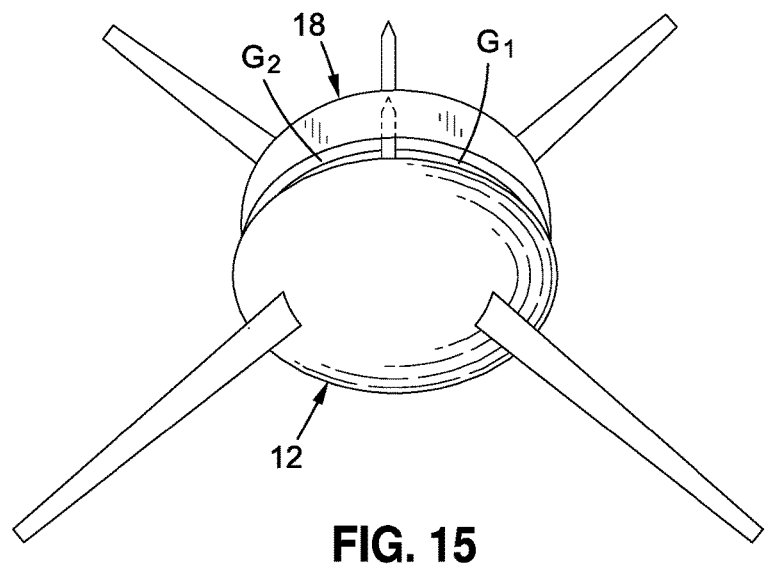
FIG. 15 is a rear view of an air tug coupled to a UAV.

When the UAV 12 is coupled to the air tug 18, the UAV 12 and air tug 18 collectively define a first assembly. According to one embodiment, the air tug 18 and UAV 12 are specifically configured and adapted to create negative pressure as a result of near field interaction between the air tug 18 and the UAV 12 to assist in coupling the air tug 18 to the UAV 12. Referring now to FIG. 15, the air tug 18 and UAV 12 are configured to create a gap therebetween, such that airflow over the first assembly creates suction which urges the UAV 12 toward the air tug 18. In particular, the size of the gap $G_1$ between the air tug 18 and the UAV 12 adjacent the forward end of the air tug 18 is smaller than the size of the gap $G_2$ between the air tug 18 and the UAV 12 adjacent the aft end of the air tug 18. This particular gap configuration causes the pressure between the air tug 18 and the UAV 12 to be approximately base pressure, which is approximately 0.15 times dynamic pressure below the surrounding static pressure, thus creating the suction, which tends to urge the air tug 18 and UAV 12 together during the "latch-up."

Figure 16:
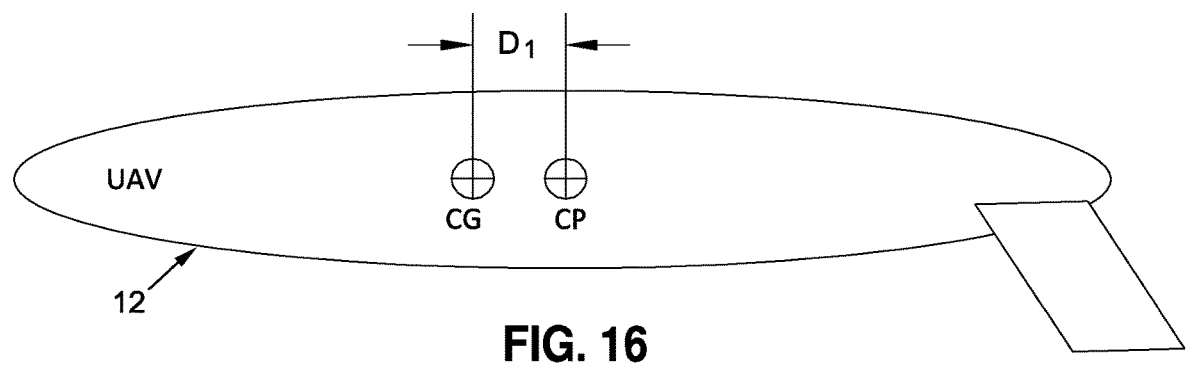
FIG. 16 is a schematic view of the UAV.
Figure 17:
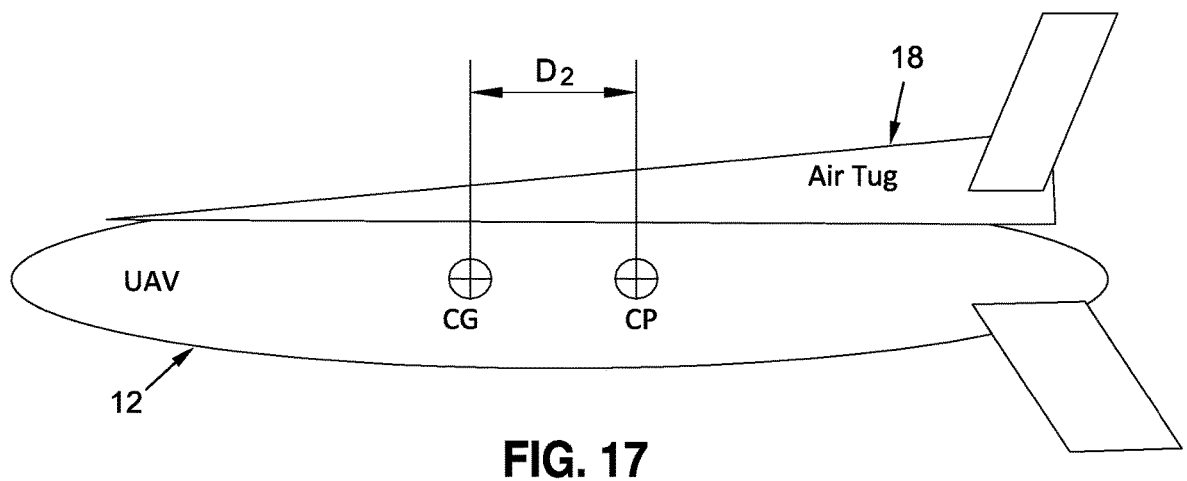
FIG. 17 is a schematic view of a combined UAV and air tug.

The UAV 12 and air tug 18 are further configured to increase the Static Margin of the first assembly to acceptable levels in order to achieve stable recovery through the disturbed airflow in the near field of the host aircraft. Along these lines, Static Margin can be defined as the distance between the longitudinal Center of Gravity (CG) of a flight vehicle, and its Center of Pressure (CP) divided by the diameter of the vehicle; the greater the Static Margin, the greater the longitudinal damping of the flight vehicle. High damping is desirable for stable recovery of a towed vehicle because it is subject to aerodynamic disturbance as the towed vehicle approaches downwash, span-wise flow and vortices in the near field of the towing aircraft. Thus, it is desirable for a towed vehicle to have a greater static margin than a typical UAV 12. To that end, and referring now specifically to FIG. 16, the UAV 12 alone includes a Center of Gravity (CG) spaced from the Center of Pressure (CP) by a distance D1. FIG. 17 depicts the first assembly, i.e., the combined air tug 18 and UAV 12, wherein the Center of Pressure (CP) is spaced from the Center of Gravity (CG) by a distance D2, which is larger than the distance D1, which provides additional damping and aerodynamic stability to allow for smooth recovery.

The air tug 18 and UAV 12 are designed, such that steady tow of the air tug 18 or combined air tug 18 and UAV 12 meet required aerodynamic criteria known to those in the tow vehicle design, such as Static Margin and tow adapter recovery angle.

With the basic structure of the system 10 described above, the following discussion will focus on an exemplary use of the system 10. The first assembly will deploy through the extension of the cable 16 from the base 14 to a length sufficiently behind and below the locally disturbed airflow near the host aircraft 20. Once the length is achieved, the UAV 12 will be released from the air tug 18. After such release, the UAV 12 will deploy its wings 22. In general, release of the UAV 12 must occur before wing deployment to prevent generated lift (or thrust) from creating slack in the cable 16. It is contemplated that the UAV 12 may perform most of its pre-flight checks prior to release while still in tow and captive to the air tug 18, such that it can be recovered in the case of malfunction (e.g., failure of its engine to ignite).

Following UAV release, the air tug 18 may be reeled in and stored until UAV 12 recovery is needed. To recover the UAV 12, the air tug 18 is extended, and a beacon (e.g., transceiver 60) is activated to transmit a signal to the UAV 12. The signal emitted by the beacon may be a laser signal, infrared signal, radio frequency signal, or other signal known in the art. The UAV 12 will navigate to the beacon, and when in close proximity thereto, the UAV 12 will deploy the connector 86 and extend the extension arm 88. Lifting surfaces 56 on the air tug 18 can counter near field effects of the approaching UAV 12 to achieve steady tow, while overcoming friction and latching forces, such that the extension arm 88 is advanced into a receptacle 52 on the air tug 18 to obtain a positive latch 130 for securing the air tug 18 to the UAV 12 such that they behave as a single towed body.

Following latch 130 engagement, the connector 86 will retract to eliminate the needed compliance during capture, and thereby form a rigid attachment between the air tug 18 and the UAV 12. It is also contemplated that the UAV 12 and air tug 18 may additionally, or alternatively, use negative pressure of the near field interaction between the air tug 18 and the UAV 12 to form a link between the two structures.

Furthermore, the configuration of the airborne docking system 10 is such that sufficient tension on the towline 16 is maintained to assure towline stability (dampen transverse oscillations by: 1) providing the air tug 18 with sufficient negative lift or drag, 2) developing a towline with low enough mass and high enough drag that the catenary formed due to slack provides sufficient drag to stabilize the towline 16, or 3) implement a high speed winch or arm to rapidly remove slack.

Once capture has been achieved, the UAV 12 will fold its wings 84 and shut off its engine. The combined air tug 18 and UAV 12 (with folded wings) will act as a single, stable, towed body, with the combination being reeled back to the host and recovered into the base 14.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. An airborne docking method for an unmanned aerial vehicle, the airborne docking method comprising the steps of:

securing an unmanned aerial vehicle (UAV) to a host aircraft via a docking assembly having a base coupled to the host aircraft, a tug device, and a cable connecting the tug device to the base, the tug device being engaged with the base, and the UAV being engaged to the tug device;

deploying the tug device from the base and extending the cable therebetween to distance the tug device from the base; and disengaging the UAV from the tug device;

reengaging the UAV with the tug device while the UAV is in flight;

wherein the UAV and the tug device are collectively configured to create a near field interaction between the UAV and the tug device to create a negative pressure therebetween as a result of fluid flowing by the UAV and the tug device so as to urge the UAV toward the tug device during the step of reengaging the UAV with the tug device.

2. The method recited in claim 1, further comprising the step of transitioning wings on the UAV from a stowed configuration to a deployed configuration after the disengaging step.

3. The method recited in claim 1, further comprising the step of retracting the tug device after the disengaging step.

4. The method recited in claim 3, further comprising the step of redeploying the tug device from the base after the retracting step.

5. The method recited in claim 4, further comprising the step of transmitting a beacon signal to the UAV.

6. The method recited in claim 1, wherein the step of reengaging the UAV with the tug device includes deploying a connector on the UAV, the connector being engageable with the tug device.

7. The method recited in claim 1, further comprising the step of transitioning the wings on the UAV from a deployed configuration to a stowed configuration after the UAV has been reengaged with the tug device.

8. An airborne docking system for use with a host aircraft, the airborne docking system comprising:

a base connectable to the host aircraft;

a cable connected to the base, the cable being configured to define an exposed portion as that portion of the cable extending out from the base;

a tug device engaged with the cable and being transitional relative to the base between a stowed position and a deployed position, the tug device moving away from the base and increasing a length of the exposed portion of cable as the tug device transitions from the stowed position toward the deployed position; and an unmanned aerial vehicle (UAV) engageable with the tug device, the UAV being transitional between:
- a first mode wherein the UAV is engaged with the tug device while the tug device is transitioned from the stowed position to the deployed position;
- a second mode wherein the UAV is disengaged from the tug device and is configured to operate independent of the tug device;
- a third mode wherein the UAV is engaged with the tug device while the tug device is transitioned from the deployed position to the stowed position; and
- wherein the UAV defines a first static margin and the UAV and tug device collectively define a second static margin when the UAV is connected to the tug device during flight, the second static margin being greater than the first static margin.

9. The airborne docking system recited in claim 8, further comprising a winch coupled to the base and the cable, the winch being adapted to control movement of the cable relative to the base.

10. The airborne docking system recited in claim 9, further comprising a ram air turbine in operative communication with the winch for providing power to the winch.

11. The airborne docking system recited in claim 8, wherein the tug device comprises a fuselage and at least one controllable lifting surface moveable relative to the fuselage for controlling lift generated by the tug device.

12. The airborne docking system recited in claim 8, wherein the tug device comprises a fuselage and at least one controllable lifting surface movable relative to the tug device fuselage for controlling longitudinal and lateral position of the tug device relative to the UAV, the at least one controllable lifting surface being electronically controlled by a processor to guide the tug device toward the UAV.

13. The airborne docking system recited in claim 8, wherein the tug device includes a first transceiver and the UAV includes a second transceiver, the first and second transceivers configured to communicate with each other.

14. The airborne docking system recited in claim 8, wherein the UAV includes a fuselage and a pair of wings selectively transitional relative to the fuselage between a stowed configuration and a deployed configuration, wherein a portion of each wing moves away from the fuselage as the pair of wings transition from the stowed configuration toward the deployed configuration.

15. The airborne docking system recited in claim 14, wherein the pair of wings pivot relative to the fuselage between the stowed configuration and the deployed configuration.

16. The airborne docking system recited in claim 8, wherein the UAV includes a connector adapted to engage with the tug device.

17. The airborne docking system recited in claim 16, wherein the connector is of a variable length, the connector being configured to enable shortening of the variable length after engagement with the tug device to pre-load the UAV and the tug device together to act as a single unit.

18. The airborne docking system recited in claim 16, wherein the UAV includes a fuselage, the connector being transitional relative to the fuselage between a stowed position and a deployed position.

19. The airborne docking system recited in claim 8, wherein the UAV and the tug device are collectively configured to create a near field interaction to generate negative pressure therebetween in response to fluid flow over the UAV and the tug device.

20. The airborne docking system recited in claim 8, wherein the tug device includes a fuselage and a pair of guides coupled to the fuselage and positioned forward of a center of pressure of the tug device, the guides being configured to facilitate alignment of the UAV relative to the tug device as the UAV approaches the fuselage for docking.

21. The airborne docking system recited in claim 20, wherein the guides are moveable relative to the fuselage between an extended position and a retracted position, a distal end of each guide moving away from the fuselage as each guide moves from the retracted position toward the extended position.

* * * * *